Feb. 25, 1930.  C. J. ROMIEUX ET AL  1,748,619
METHOD OF MAKING DI-THIOPHOSPHATES
Filed Nov. 14, 1927
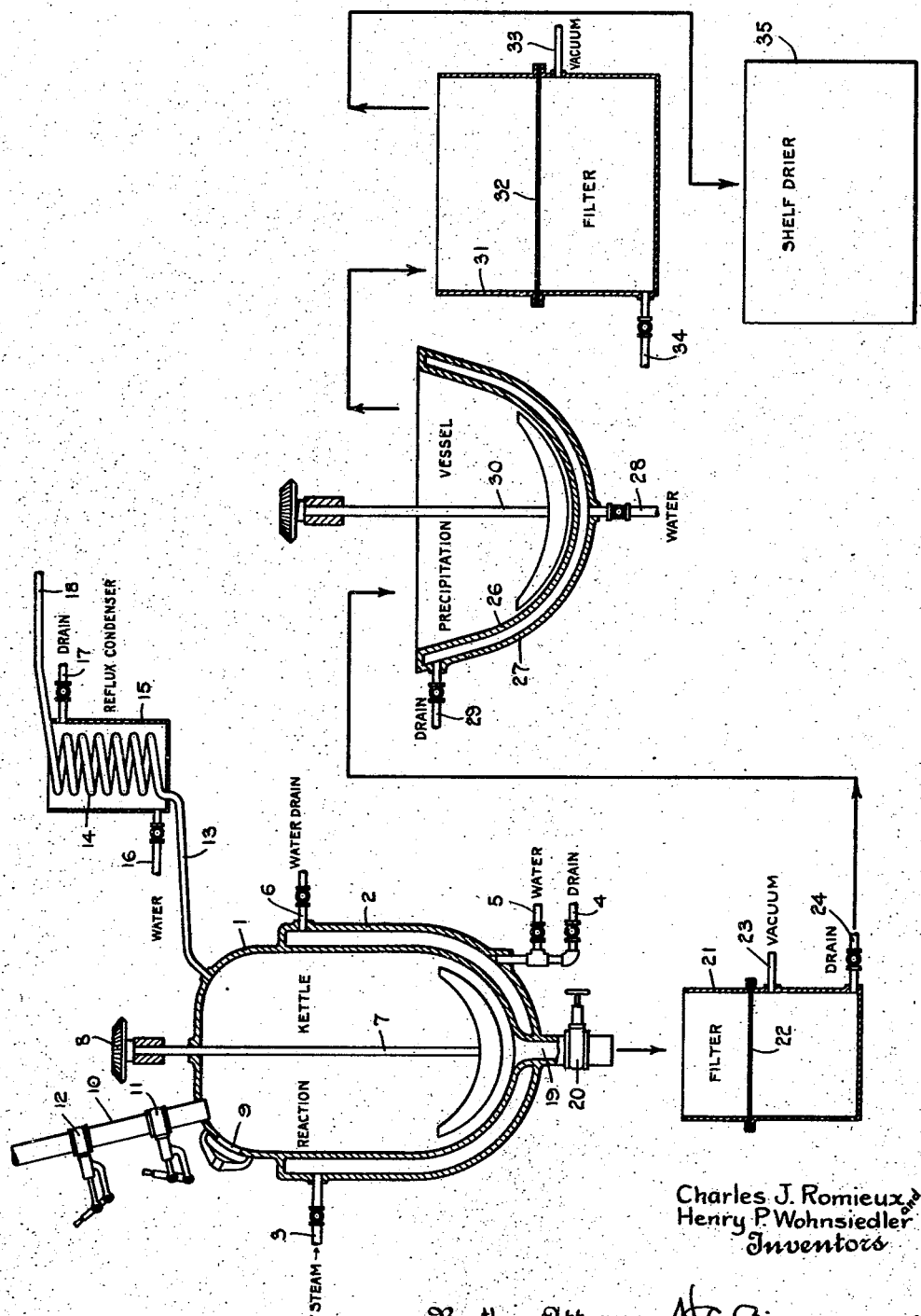
Charles J. Romieux
Henry P. Wohnsiedler
Inventors
By their Attorney Patented Feb. 25, 1930

1,748,619

UNITED STATES PATENT OFFICE

CHARLES J. ROMIEUX AND HENRY P. WOHNSIEDLER, OF ELIZABETH, NEW JERSEY, ASSIGNORS TO AMERICAN CYANAMID COMPANY, OF NEW YORK, N. Y., A CORPORATION OF MAINE

METHOD OF MAKING DI-THIOPHOSPHATES

Application filed November 14, 1927. Serial No. 233,056.

This invention relates to organic compounds containing sulphur and phosphorus and more particularly to substituted products of thio-phosphoric acids. Compounds of this character are suitable for a number of uses and are especially adapted for use as accelerators of vulcanization of rubber products and as promoters of flotation of sulphide ores.

This invention contemplates a method of preparation of compounds of this character which is simple in operation, not requiring any specially skilled labor, which does not require any expensive or complicated apparatus and which involves the use of low cost and readily available raw materials.

In general, products of the character described herein may be prepared by causing a reaction between phosphorous pentasulphide and any one of a number of organic oxygen containing compounds, either of the aromatic or of the aliphatic type. Among such compounds may be mentioned the phenols and the aliphatic alcohols. The reaction results in a product which contains impurities because of the impure raw materials used and because of the side reactions, and for many purposes it is highly desirable that the product be of a high grade of purity. The present invention, therefore, contemplates the production and purification, not only of the substituted thio-phosphoric acids, but also of compounds or salts thereof.

In practicing this invention a reaction is caused to take place between phosphorous pentasulphide and a suitable organic compound such as iso-propyl alcohol under suitable conditions to control the reaction, and the impure product, which consists chiefly of di-iso-propyl-di-thio-phosphoric acid, may be treated in one of two ways for purpose of purification. The first method consists in adding to the product of the reaction a suitable amount of a solvent, such as solvent naphtha, and introducing into the reaction vessel a compound which will react with the product, such as an amine or ammonia. The product of this reaction is insoluble in the solvent used and may be recovered therefrom in a highly pure state by simple filtration.

The alternative method consists in dissolving the product of the first reaction in an alkaline substance such as an aqueous solution of sodium carbonate, which causes a separation of the mixture into two layers, one of which contains a solution of the sodium salt of the compound which is separated from the residue and treated with an acid, such as hydrochloric acid, to regenerate the original product in a purified state. The pure product is then dissolved in a solvent such as solvent naphtha or water and the compound precipitated therefrom by the addition of an amine, a base or a metal salt.

In the accompanying drawing constituting a part hereof, the single figure is a diagrammatic view illustrating an apparatus capable of carrying out the present invention.

There is provided a reaction kettle 1, having a jacket 2 around the lower portion thereof, containing an inlet 3 for steam for heating purposes and an outlet 4 for the removal of condensed water. The jacket is also provided with an inlet 5 for water for cooling purposes and an outlet 6 for waste water. A stirrer 7 in the kettle 1 is rotated by a suitable source of power at point 8. In the upper portion of the kettle 1 is an opening 9 closed by a manhole cover or the like, and there is also provided a pipe 10 in the upper portion of the kettle and placed at a slight angle and provided with gate valves 11 and 12.

A pipe 13 is connected with reflux condenser 14 placed in a tank 15 having an inlet 16 and an outlet 17 for cooling water. The condenser has an outlet 18 for the removal and, if desired, the recovery of gases produced in the apparatus. In the bottom of kettle 1 is a pipe 19 provided with a valve 20 for the removal of material therefrom.

There is also provided a filter consisting of a chamber 21 having a filtering medium 22 therein dividing the filter into two portions, the lower portion of which is provided with an opening 23 for a vacuum connection and an opening 24 for the removal of the filtered product.

A precipitation vessel 26 is provided with a jacket 27 having a water inlet 28 and a water outlet 29 for cooling purposes. A stirrer 30 is provided for the vessel 26. A filter 31 has a filtering medium 32 dividing the same into two portions, the lower portion being connected with a source of vacuum 33 and having an outlet 34. A dryer 35 of the shelf type is provided.

In the operation of the invention for the production, for example, of the aniline salt of di-iso-propyl-di-thio-phosphoric acid, a suitable amount of iso-propyl alcohol is first introduced into the kettle 1 through opening 9 and the same is heated by steam in the jacket 2 to a temperature of 50 to 60 degrees C. Ground phosphorous pentasulphide is introduced into the kettle 1 through pipe 10 by opening valve 12, placing a small portion of phosphorous pentasulphide in the pipe, closing valve 12 and opening valve 11 to allow the same to flow into kettle 1. Valve 11 is then closed and the operation is repeated.

Hydrogen sulphide is liberated and considerable heat is developed. The temperature of the kettle 1 is so adjusted by the rate of addition of phosphorous pentasulphide and by the introduction of cooling water into the jacket 2 that so long as a considerable excess of alcohol is present it does not boil so violently as to flood the condenser 14. The hydrogen sulphide liberated passes out through pipe 13, condenser 14 and outlet 18 and the condensed alcohol from condenser 14 flows back to kettle 1 for further use.

The temperature of the reaction is maintained at about 85 degrees C. and as the rate of reaction decreases, steam is introduced into the jacket 2 in order to maintain approximately this temperature until all the phosphorous pentasulphide has reacted. The reaction is complete in about two hours, the time varying with the degree of sub-division and the rate of addition of the sulphide.

The resulting liquid, which contains solid impurities introduced with the phosphorous pentasulphide, is allowed to cool to room temperature and is removed from the kettle 1 through pipe 19 and subjected to filtration in the filter 21. The product removed from outlet 24 of the filter contains 80 to 95 per cent of di-iso-propyl di-thio-phosphoric acid. The product is placed in precipitation vessel 26 and solvent naphtha is added in the ratio of about 35 gallons of the naphtha to 252 pounds of the crude (85%) product. 93 pounds of aniline are added very slowly with stirring and cooling by means of the jacket 27. The aniline salt separates out as a white crystalline material and the mixture, which is allowed to cool to room temperature, is placed in filter 31 to separate the aniline salt from the solvent naphtha, which is removed from the filter through outlet 34. The filtered aniline salt is placed in shelf dryer 35 at a temperature of about 60 degrees C., to free it of naphtha. After three or four operations the solvent naphtha becomes so laden with impurities that it is necessary to distill the same to recover the pure solvent naphtha for further use in the process.

An alternate method of making the aniline salt described above consists in first producing the crude di-iso-propyl di-thio-phosphoric acid and adding to the same a solution of sodium carbonate in the ratio of approximately 53 pounds of sodium carbonate in 320 pounds of water, to about 252 pounds of crude (85%) acid. The temperature is maintained at or below 25 degrees C. in precipitation vessel 26 by means of cooling water in jacket 27 whereby the mixture separates into two layers, the lower layer consisting of an aqueous solution of sodium di-iso-propyl di-thio-phosphate and an oily layer consisting of the impurities in the crude acid. The upper layer is separated off and the lower layer is treated with 136 pounds of 37% hydrochloric acid, forming an oily layer of the free di-thio-phosphoric acid which is separated and dried over anhydrous sodium sulphate or similar agent. The purifier di-thio-phosphoric acid is dissolved in solvent naphtha in the ratio of 35 gallons of the naphtha to 214 pounds of the acid. 93 pounds of aniline are then added very slowly with stirring to the vessel 26 with cooling, and the aniline salt formed in the reaction separates out as a white crystalline material. It is separated from the solvent naphtha as described above. In this modification it is not necessary to redistill the solvent naphtha but it may be reused without any purification since it is not used to remove any impurities from the raw materials employed.

This invention is adapted for the production of pure compounds of the di-thio-phosphate type by a relatively simple procedure which consists essentially in the reaction between a suitable organic compound and phosphorous pentasulphide, the product of which is dissolved and purified directly or is caused to react to form a salt of the di-thio-phosphoric acid before purification by a very simple procedure. The invention contemplates the manufacture, not only of the specific compound described herein, but also of related products such as those formed by the substitution of other alcohols or of phenols for the iso-propyl alcohol and the use of other amines, either primary or secondary, or inorganic salts such as soluble salts of sodium, zinc or lead for the aniline.

When soluble metallic inorganic bases or salts are used and when the corresponding di-thio-phosphate is insoluble, the salt is formed in an aqueous solution of the acid. The ammonium salt is prepared from solvent naphtha solution.

It will be apparent that various changes in the details of manipulation may be made within the spirit of this invention, the scope of which is set forth in the claims appended hereto. By the term "di-thio-phosphate" as used in the claims we intend to include not only salts of the acid but also the free acid itself, since the thio-phosphoric acid may be considered a hydrogen phosphate in accordance with the usual chemical terminology.

By the term "phosphorous pentasulfide" we intend to include not only the pure material but various crude grades of the sulfide. Commercial phosphorous pentasulfide usually contains other sulfides of phosphorus which do not prevent the desired reactions, and many of the phosphorous sulfides contain the pentasulfide mixed therewith in greater or lesser amounts. The phosphorous pentasulfide may well be formed during the reaction by mixing phosphorus and sulfur in the reaction mixture.

What we claim is:

1. A method of making di-thio-phosphates which comprises causing a reaction between phosphorous pentasulphide and an organic hydroxy compound, adding a solvent thereto, introducing an amine, and removing the product from the solvent.

2. A method of making di-thio-phosphates which comprises causing a reaction between phosphorous pentasulphide and an organic hydroxy compound, adding a hydrocarbon solvent thereto, introducing an amine, and removing the product from the solvent.

3. A method of making di-thio-phosphates which comprises causing a reaction between phosphorous pentasulphide and an organic hydroxy compound, adding a hydrocarbon solvent thereto, introducing aniline, and removing the product from the solvent.

4. A method of making di-thio-phosphates which comprises causing a reaction between phosphorous pentasulphide and an organic hydroxy compound, adding solvent naphtha thereto, introducing an amine and removing the product from the solvent.

5. A method of making di-thio-phosphates which comprises causing a reaction between phosphorous pentasulphide and an organic hydroxy compound, adding solvent naphtha thereto, introducing aniline and removing the product from the solvent.

6. A method of making di-thio-phosphates which comprises causing a reaction between phosphorous pentasulphide and an aliphatic alcohol, adding a solvent thereto, introducing aniline and removing the product from the solvent.

7. A method of making di-thio-phosphates which comprises causing a reaction between phosphorous pentasulphide and iso-propyl alcohol, adding a solvent thereto, introducing aniline and removing the product from the solvent.

8. A method of making di-thio-phosphates which comprises causing a reaction between phosphorous pentasulphide and iso-propyl alcohol, adding solvent naphtha thereto, introducing aniline and removing the product from the solvent.

9. A method of making di-thio-phosphates which comprises causing a reaction between phosphorous pentasulphide and an organic hydroxy compound, adding a solution of an alkaline material to dissolve the product, removing the aqueous layer and recovering the di-thio-phosphoric acid therefrom.

10. A method of making di-thio-phosphates which comprises causing a reaction between phosphorous pentasulphide and an organic hydroxy compound, adding a solution of an alkaline material to dissolve the product, removing the aqueous layer and recovering the di-thio-phosphoric acid therefrom by treatment with an acid.

11. A method of making di-thio-phosphates which comprises causing a reaction between phosphorous pentasulphide and an organic hydroxy compound, adding a solution of an alkali metal carbonate to dissolve the product, removing the aqueous layer and recovering the di-thio-phosphoric acid therefrom.

12. A method of making di-thio-phosphates which comprises causing a reaction between phosphorous pentasulphide and an organic hydroxy compound, adding a solution of an alkali metal carbonate to dissolve the product, removing the aqueous layer and recovering the di-thio-phosphoric acid therefrom by treatment with an acid.

13. A method of making di-thio-phosphates which comprises causing a reaction between phosphorous pentasulphide and an organic hydroxy compound, adding a solution of an alkaline material to dissolve the product, removing the aqueous layer, recovering the di-thio-phosphoric acid therefrom, dissolving the same in solvent naphtha and adding an amine thereto.

14. A method of making di-thio-phosphates which comprises causing a reaction between phosphorous pentasulphide and an organic hydroxy compound, adding a solution of an alkaline material to dissolve the product, removing the aqueous layer, recovering the di-thio-phosphoric acid therefrom, dissolving the same in solvent naphtha and adding aniline thereto.

15. A method of making di-thio-phosphates which comprises causing a reaction between phosphorous pentasulphide and an organic hydroxy compound, adding a solution of an alkaline material to dissolve the product, removing the aqueous layer, recovering the di-thio-phosphoric acid therefrom, dissolving the same in a solvent and adding an amine thereto.

In testimony whereof, we have hereunto subscribed our names this 4th day of November, 1927.

CHARLES J. ROMIEUX.
HENRY P. WOHNSIEDLER.